US010208952B2

(12) United States Patent
Jarry et al.

(10) Patent No.: US 10,208,952 B2
(45) Date of Patent: Feb. 19, 2019

(54) COMBUSTION METHOD AND INSTALLATION WITH OPTIMIZED ENERGY RECUPERATION

(71) Applicant: L'Air Liquide, Societe Anonyme pour l'Etude et l'Exploitation des Procedes Georges Claude, Paris (FR)

(72) Inventors: Luc Jarry, Beaufai (FR); Youssef Joumani, Crespieres (FR); Bertrand Leroux, Breuillet (FR); Remi Tsiava, Saint Germain-les-Corbeil (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 407 days.

(21) Appl. No.: 15/107,538

(22) PCT Filed: Dec. 19, 2014

(86) PCT No.: PCT/FR2014/053472
§ 371 (c)(1),
(2) Date: Jun. 23, 2016

(87) PCT Pub. No.: WO2015/097385
PCT Pub. Date: Jul. 2, 2015

(65) Prior Publication Data
US 2016/0320057 A1 Nov. 3, 2016

(30) Foreign Application Priority Data
Dec. 23, 2013 (FR) ...................................... 13 63477

(51) Int. Cl.
F23L 7/00 (2006.01)
C03B 5/235 (2006.01)
(Continued)

(52) U.S. Cl.
CPC .............. F23L 7/007 (2013.01); C03B 5/237 (2013.01); C03B 5/2353 (2013.01); F23C 9/06 (2013.01);
(Continued)

(58) Field of Classification Search
CPC .............. F23L 7/00; F23L 15/04; F23D 14/66
(Continued)

(56) References Cited

U.S. PATENT DOCUMENTS 7,062,912 B2 * 6/2006 Penfornis ................ F01K 3/185
60/649
8,851,883 B2 * 10/2014 Jarry ..................... C03B 5/2353
126/99 R
(Continued)

FOREIGN PATENT DOCUMENTS

EP 0 872 690 10/1998
EP 1 338 848 8/2003
(Continued)

OTHER PUBLICATIONS

International Search Report and Written Opinion for PCT/FR2014/053472, dated May 22, 2015.

Primary Examiner — Gregory Huson
Assistant Examiner — Nikhil Mashruwala
(74) Attorney, Agent, or Firm — Christopher J. Cronin

(57) ABSTRACT

Combustion method and installation in which an oxygen-rich oxidant is preheated by exchange of heat with a heat-transfer fluid, upstream of the combustion chamber, in which method and installation an auxiliary gas is heated by heat exchange with a first proportion of the hot flue gases discharged from the chamber, and in which method and installation the heat-transfer fluid comprises a mixture of at least a proportion of the heated auxiliary gas with a proportion of hot flue gases.

13 Claims, 1 Drawing Sheet

(51) Int. Cl.
*C03B 5/237* (2006.01)
*F23L 15/04* (2006.01)
*F23C 9/06* (2006.01)
*F23D 14/32* (2006.01)

(52) U.S. Cl.
CPC ............ *F23D 14/32* (2013.01); *F23L 15/045* (2013.01); *F23C 2202/30* (2013.01); *F23K 2900/01041* (2013.01); *F23L 2900/07005* (2013.01); *Y02E 20/322* (2013.01); *Y02E 20/344* (2013.01); *Y02E 20/348* (2013.01); *Y02P 40/535* (2015.11); *Y02P 40/55* (2015.11); *Y02P 40/57* (2015.11)

(58) Field of Classification Search
USPC .................................................. 431/11, 8, 10
See application file for complete search history.

(56) References Cited

U.S. PATENT DOCUMENTS

| | | | |
|---|---|---|---|
| 9,945,558 B2 * | 4/2018 | Uchida | F23C 9/08 |
| 2011/0041740 A1 * | 2/2011 | Reilly | F23C 9/00 |
| | | | 110/341 |
| 2016/0320057 A1 * | 11/2016 | Jarry | C03B 5/2353 |

FOREIGN PATENT DOCUMENTS

| | | |
|---|---|---|
| EP | 2 546 204 | 1/2013 |
| FR | 3 015 636 | 6/2015 |
| WO | WO 2006/054015 | 5/2006 |

* cited by examiner

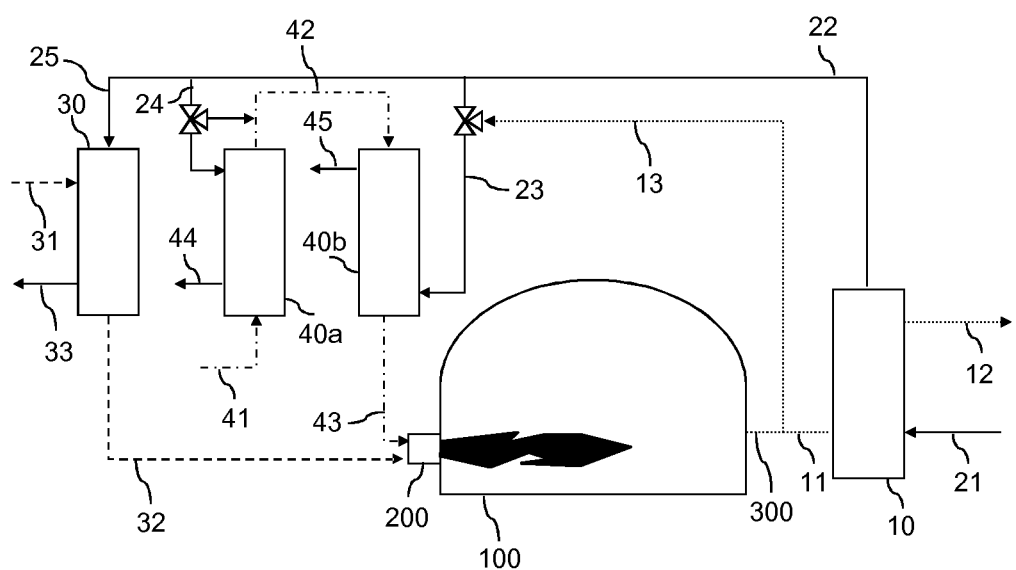

COMBUSTION METHOD AND INSTALLATION WITH OPTIMIZED ENERGY RECUPERATION

CROSS REFERENCE TO RELATED APPLICATIONS

This application is a § 371 of International PCT Application PCT/FR2014/053472, filed Dec. 19, 2014, which claims the benefit of FR1363477, filed Dec. 23, 2013, both of which are herein incorporated by reference in their entireties.

FIELD OF THE INVENTION

The present invention relates to a process for the combustion of a fuel using, as oxidant, a preheated oxygen-rich gas.

BACKGROUND OF THE INVENTION

In industry, air remains the oxidant, that is to say the combustion oxidizer, most often used.

However, it is known to use oxygen instead of air as oxidant, in particular for improving the efficiency of the combustion and thus the energy yield of an industrial installation comprising a combustion chamber, in order to maximize the use of the thermal energy generated in the combustion chamber and in order to reduce the polluting emissions of the combustion chamber, such as $NO_x$.

While the energy and environmental advantage of combustion with oxygen is well known and recognized, the cost of oxygen in comparison with that of air continues to limit the use of oxygen as oxidant in an industrial context.

In order to improve still more the efficiency of oxycombustion and to thus reduce the need for fuel and for oxygen for a given industrial process, processes for the preheating of oxygen have been developed.

It is known in particular to preheat oxygen in a heat exchanger.

In particular, a method is known for the indirect preheating of oxygen with the residual heat present in the combustion gases (flue gases) at the outlet of the combustion chamber. According to this method, an auxiliary fluid is preheated in an auxiliary exchanger by direct exchange with the hot flue gases. The oxygen is subsequently preheated in at least one main heat exchanger by direct exchange with the hot auxiliary fluid resulting from the auxiliary exchanger. If appropriate, the fuel is also preheated by direct exchange with the hot auxiliary fluid in an additional heat exchanger. Various embodiments of this method are described in particular in EP-A-0 872 690 and WO 2006/054015.

EP-A-2 546 204 describes a glass melting process using another embodiment of the indirect preheating method. During a first phase of the process which is a subject matter of EP-A-2 546 204, a first flow rate DO1 of an oxygen-rich oxidant is provided for the combustion of a fuel in a combustion chamber, this oxygen-rich oxidizer having been preheated by heat exchange with an oxidizer poorer in oxygen, said poorer oxidizer being heated by heat exchange with the flue gases generated in the combustion chamber. During a second phase, use is made, as oxidant, of a reduced flow rate DO2 of the oxygen-rich oxidizer and also of a flow rate DA2 of the heated poorer oxidizer.

EP-A-1 338 848 describes a process for the recovery of heat from the flue gases from a furnace using an oxidant enriched in oxygen. The discharged flue gases are used for the direct or indirect preheating of the fuel and/or of the oxidant in a direct or indirect heat exchange system. The flue gases are subsequently introduced into a heat recovery boiler for the production of mechanical energy. The direct or indirect heat exchange system or systems can be provided with a bypass for flue gases in order to regulate the portion of said flue gases actually introduced into the heat exchange system.

In comparison with other known methods for the preheating of oxygen, the indirect preheating method exhibits the major advantage of greater safety. This is because, in the event of a perforation by corrosion or by erosion inside the auxiliary exchanger, the hot flue gases, liable to contain residual combustible matter, come into contact only with the auxiliary fluid. Similarly, in the event of a perforation inside a main or additional exchanger, the oxygen or respectively the fuel comes into contact only with the auxiliary fluid.

The energy balance of this method is particularly positive.

However, one disadvantage of this method is the space required by the different exchangers and in particular by the auxiliary exchanger, it being known that, in order to avoid heat losses, said exchangers are positioned as close as possible to the outlet of the flue gases from the combustion chamber.

Another disadvantage is the cost of the various heat exchangers which, given the temperatures and the nature of the fluids circulating inside, have to be particularly robust.

The exchangers are designed and sized for optimum operation under the conditions (temperatures and flow rates of the fluids circulating in the exchangers) which correspond to the nominal conditions of the industrial installation comprising the combustion chamber, that is to say to the normal operating conditions of the industrial installation.

However, industrial installations can be induced to operate outside their nominal conditions and more particularly with a higher heat requirement than during their normal operation, for example because of aging or wear of the installation or during an increased output campaign of a melting furnace.

In this case, the operation of the preheating method is not optimal owing to the fact that the auxiliary exchanger exhibits an ability to recover residual heat from the discharged flue gases which is too low with respect to the heat requirement: the residual heat actually recovered is then insufficient for the use or the different uses which it is desired to make of it, such as the preheating of oxygen, the preheating of the fuel and/or other uses. This results in a greater energy consumption and in particular a greater fuel consumption.

The use might be envisaged of an auxiliary exchanger having an ability to recover heat which is greater than that corresponding to the nominal operation of the installation or also the installation might be envisaged of a supplementary auxiliary exchanger to be used only when the need for recovered heat is greater than in nominal operation of the installation. However, this will result in a space requirement and an even greater cost of the installation.

The aim of the present invention is to at least partially overcome the problems described above.

SUMMARY OF THE INVENTION

It is in particular an aim of the present invention to make possible an increase in the efficiency of the heat exchanges without increasing the cost of implementation of the process, indeed even while reducing this cost.

According to the invention, this is carried out by a direct contribution of heat by the introduction of hot flue gases into a heat-exchange fluid used for preheating.

The present invention relates more particularly to a first improved process for the combustion of a fuel with a preheated oxygen-rich oxidant in a combustion chamber. This combustion generates heat and hot flue gases in said combustion chamber. The hot flue gases, which contain residual heat, are discharged from the combustion chamber. Residual heat from the discharged flue gases are subsequently recovered by heating a gas, referred to as auxiliary gas, by heat exchange with at least a part of the discharged hot flue gases in a first heat exchanger, referred to as auxiliary heat exchanger. A hot auxiliary gas and tempered flue gases are thus obtained.

At least a first part of the hot auxiliary gas thus obtained is introduced into a second exchanger, referred to as main exchanger, in which the oxidant is preheated by heat exchange with a heat-exchange gas comprising said at least a first part of the hot auxiliary gas. A preheated oxidant and a tempered heat-exchange gas are thus obtained.

The preheated oxidant is supplied to the combustion chamber for the combustion of the fuel.

According to certain embodiments of the invention, it is possible to increase the thermal energy content of the heat-exchange gas by mixing a portion of the discharged hot flue gases, which is not introduced into the auxiliary exchanger, with the at least a first part of the hot auxiliary gas before said at least a part of the hot auxiliary gas is introduced into the main exchanger for the preheating of an oxidant.

By virtue of this greater thermal energy content of the heat-exchange gas, the present invention makes it possible to respond to a greater requirement for thermal energy in the combustion chamber, for example a more requirement for thermal energy which is greater than the nominal requirement of the installation.

The invention also makes it possible to compensate for a reduction in efficiency of one or more of the heat exchangers, for example due to aging of the installation.

In the present content:
- an "oxygen-rich" or "rich" gas is understood to mean a gas having an oxygen content of greater than or equal to 70 vol %, preferably greater than or equal to 90 vol %, and even greater than or equal to 95 vol % (that is to say, from 95 vol % to 100 vol %);
- a "predominantly inert" gas is understood to mean a gas consisting, for more than 50 vol %, of one or more substances which do not participate in the combustion (neither as fuel nor as oxidant) under the conditions existing in the combustion chamber. A predominantly inert gas thus necessarily comprises less than 50 vol % of oxygen;
- "heat exchanger" is understood to mean a heating installation or device in which the first fluid (gas), which contributes heat, and the fluid (gas) to be heated circulate in separate chambers, the first fluid transmitting heat to the fluid to be heated through one or more walls separating the two chambers, that is to say without direct contact and without mixing between the two fluids;
- "burner" is understood to mean a device or a set of devices for bringing at least one fuel into contact with at least one oxidant in order to make possible the combustion of said at least one fuel by means of said at least one oxidant. A burner typically comprises injectors and/or lances for the injection of fuel and oxidant into a combustion region. A burner can also comprise other components, such as an igniter, a flame detector, and the like;
- "residual heat" is understood to mean the heat which is discharged from the combustion chamber with the flue gases generated by the combustion;
- "preheating" is understood to mean the heating of a product, such as a fuel, an oxidant or also a feedstock to be heated or melted, before it is introduced into the combustion chamber.

In the present context, two components or devices are "fluidically connected" when these two components are connected by at least one pipeline or at least one pipe so as to make possible the transportation of a fluid through said at least one pipeline or through said at least one pipe from one of the two components toward the other of the two components.

According to certain embodiments of the invention, the auxiliary gas is preferably air or a predominantly inert auxiliary gas or also a mixture of air with a predominantly inert gas.

The auxiliary gas can in particular be chosen from air, steam and $CO_2$, or also a mixture of at least two of said gases, the auxiliary gas preferably being air.

As indicated above, the recovery of residual heat by such an auxiliary gas exhibits the advantage of great safety.

In so far as, according to the present invention, the content of hot flue gases in the heat-exchange gas remains fairly low, this safety is maintained.

Thus, the content of discharged hot flue gases of the heat-exchange gas will advantageously be maintained at less than or equal to 30 vol % and preferably less than or equal to 20 vol %. In order to significantly increase the thermal energy content of the heat-exchange fluid, the content of discharged hot flue gases of the heat-exchange gas is preferably at least 10 vol %. The ratio by volume of, on the one hand, discharged hot flue gases to, on the other hand, hot auxiliary gas in the heat-exchange gas is preferably less than or equal to 43 vol %, preferably less than or equal to 25 vol % and preferably at least 11 vol %.

As indicated above, the auxiliary exchanger and the main exchanger are typically designed and sized for optimum operation under the nominal conditions of the industrial installation comprising the combustion chamber.

In this case, the thermal energy content of the first part of the hot auxiliary gas is sufficient for the preheating of the oxidant under the normal conditions of operation of the industrial installation and it is not necessary to increase the thermal energy content of the heat-exchange gas under these normal conditions but only when the process requires a greater recovery of the residual heat of the discharged flue gases.

In certain embodiments, the present invention thus may also relate to a second flexible process for the combustion, in a combustion chamber, of a fuel with a preheated oxygen-rich oxidant with generation of heat and hot flue gases inside said combustion chamber. As already described above in connection with a first process according to the invention, the hot flue gases, which contain residual heat, are discharged from the combustion chamber. Residual heat is recovered from said discharged hot flue gases by heating an auxiliary gas by heat exchange, in an auxiliary heat exchanger, with at least a part of the discharged hot flue gases. Hot auxiliary gas and tempered flue gases are thus obtained.

At least a part of the hot auxiliary gas is then introduced into a main exchanger in which the oxygen-rich oxidant is preheated by heat exchange with a heat-exchange gas, said heat-exchange gas comprising said at least one part of the hot auxiliary gas. Preheated oxidant and tempered heat-exchange gas are thus obtained.

The preheated oxygen-rich oxidant is subsequently supplied to the combustion chamber for the combustion of the fuel.

The second process according to the invention is flexible in that it exhibits several modes of operation:

a first mode of operation in which the heat-exchange gas does not comprise discharged flue gases, this first mode of operation being, for example, used during the nominal operation of the industrial installation, and a second mode of operation in which the thermal energy content of the heat-exchange gas is increased by adding thereto a part of the discharged hot flue gases which has not been introduced into the auxiliary exchanger and the residual heat of which has thus not been recovered in order to heat the auxiliary gas.

Said second mode of operation consequently corresponds to the first process according to the invention, different embodiments of which have been described above.

In the first mode of operation of the second process, the heat-exchange gas consists of hot auxiliary gas.

The processes according to the invention advantageously also comprise a stage in which the fuel is also preheated in a heat exchanger referred to as fuel exchanger by heat exchange with a second heat-exchange gas.

When the second heat-exchange gas corresponds to the first heat-exchange gas, the preheating of the oxidant and of the fuel take place in series. When the second heat-exchange gas, used for the preheating of the fuel, comprises a second part of the hot auxiliary gas separate from the at least one first part of the hot auxiliary gas of the first heat-exchange gas, the preheating of the oxidant and the preheating of the fuel are carried out in series.

The present invention thus makes it possible to recover a greater part of the residual heat of the discharged hot flue gases than that which it is possible to recover solely with the auxiliary exchanger.

In other words, certain embodiments of the present invention make possible an optimum recovery of the residual heat of the discharged flue gases by means of the auxiliary exchanger during the nominal operation of the installation (first mode of operation) but it also makes it possible to respond to a greater requirement for thermal energy of the installation by the recovery of a greater part of the industrial heat (second mode of operation): a first part of the residual heat being recovered by heat exchange between discharged hot flue gases and the auxiliary gas in the auxiliary exchanger; a second part of the residual heat being recovered by direct mixing of discharged hot flue gases with the hot auxiliary gas.

The combustion processes according to certain embodiments of the invention are advantageous for a large number of applications. The combustion chamber can thus be a melting chamber, a refining chamber or a melting/refining chamber, for example for the melting of glass (including enamel) or for the melting of metals. The melting chamber can also be a combustion chamber of a boiler. The invention is of particular use in the case where the combustion chamber is a glass melting chamber, a glass refining chamber or a glass melting/refining chamber, such as, for example, the melting/refining chamber of a glass furnace of float type for the manufacture of flat glass.

The present invention also relates to an installation suitable for the implementation of a combustion process according to the invention.

Such an installation comprises a combustion chamber, a first heat exchanger, referred to as auxiliary exchanger, and a second heat exchanger, referred to as main exchanger.

The combustion chamber is provided with injectors for the injection of a fuel and for the injection of an oxidant into the combustion chamber and with an outlet for flue gases. The auxiliary exchanger comprises, on the one hand, an inlet for hot flue gases and an outlet for tempered flue gases and, on the other hand, an inlet for auxiliary gas to be heated and an outlet for hot auxiliary gas. The outlet for hot flue gases of the combustion chamber is fluidically connected to the inlet for hot flue gases of the auxiliary exchanger.

The main exchanger comprises, on the one hand, an inlet for hot heat-exchange gas and an outlet for tempered heat-exchange gas and, on the other hand, an inlet for oxidant to be preheated and an outlet for preheated oxidant. The outlet for hot auxiliary gas of the auxiliary exchanger is fluidically connected to the inlet for hot heat-exchange gas of the main exchanger. The outlet for preheated oxidant is fluidically connected to at least one of the injectors of the combustion chamber.

According to certain embodiments of the invention, the installation may also include a pipeline fluidly connecting or configured to be fluidly connected to the outlet for hot flue gases to the inlet for heat-exchange gas of the main exchanger in parallel with the auxiliary exchanger. This pipeline makes it possible in this way to make possible the flow of a controlled part of the hot flue gases resulting from the outlet for flue gases toward the inlet for hot heat-exchange gas of the main exchanger.

The installation according to certain embodiments of the invention can also comprise a fuel exchanger for the preheating of fuel by means of a second combustible gas upstream of the combustion chamber. As described above in connection with the processes according to the invention, this fuel exchanger can operate in series or in parallel with the main exchanger which preheats the oxidant.

The fuel exchanger and the main exchanger can be surrounded by separate chambers or casings or can also be encased in one and the same chamber.

The injectors for the injection of fuel and oxidant are generally incorporated in burners and/or injection lances.

As indicated above, the combustion chamber can thus be a melting chamber, a refining chamber or a melting/refining chamber, for example for the melting of glass (including enamel) or for the melting of metals. The melting chamber can also be a combustion chamber of a boiler.

The invention is of particular use in the case where the combustion chamber is a glass melting chamber, a glass refining chamber or a glass melting/refining chamber, such as, for example, the melting/refining chamber of a glass furnace of float type.

As already indicated, it is possible for the necessity to operate or the advantage of operating an industrial installation outside its nominal conditions and more particularly with a greater requirement for heat than during its normal operation to only emerge a certain time after the startup of the installation, for example because of aging and wear of the installation and of the combustion chamber and/or one or more of the heat exchangers.

The advantage of the present invention may then become obvious a certain time after the construction of the installation. It is then possible to take advantage of a temporary shutdown of the installation, for example between two campaigns, to adapt the installation for the implementation of a process according to the invention.

The present invention thus also relates to a process for modifying an installation comprising a combustion chamber, a first heat exchanger, referred to as auxiliary exchanger, and a second heat exchanger, referred to as main exchanger, in which:
- the combustion chamber is provided with injectors for the injection of a fuel and for the injection of an oxidant into the combustion chamber and with an outlet for flue gases,
- the auxiliary exchanger comprises, on the one hand, an inlet for hot flue gases and an outlet for tempered flue gases and, on the other hand, an inlet for auxiliary gas to be heated and an outlet for hot auxiliary gas, the outlet for hot flue gases of the combustion chamber being fluidically connected to the inlet for hot flue gases of the auxiliary exchanger, and
- the main exchanger comprises, on the one hand, an inlet for hot heat-exchange gas and an outlet for tempered heat-exchange gas and, on the other hand, an inlet for oxidant to be preheated and an outlet for preheated oxidant, the outlet for hot auxiliary gas of the auxiliary exchanger being fluidically connected to the inlet for hot heat-exchange gas of the main exchanger, the outlet for preheated oxidant being fluidically connected to at least one of the injectors of the combustion chamber.

According to the modification process according to the invention, a pipeline capable of fluidically connecting the outlet for hot flue gases to the inlet for heat-exchange gas of the main exchanger in parallel with the auxiliary exchanger is added to said installation, so as to make possible the flow of a controlled part of the hot flue gases resulting from the outlet for flue gases toward the inlet for hot heat-exchange gas of the main exchanger.

As already indicated, the combustion chamber is a melting chamber, a refining chamber, a melting/refining chamber or a combustion chamber of a boiler, preferably a glass melting chamber, a glass refining chamber or a glass melting/refining chamber.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

The FIGURE represents a diagrammatic representation in accordance with an embodiment of the present invention.

DETAILED DESCRIPTION

The present invention is illustrated by the example below, reference being made to the FIGURE, which is a diagrammatic representation of an installation suitable for the implementation of a combustion process according to the invention.

In the present example, the process according to the invention is more particularly combined with the process described in the unpublished coexisting patent application FR 1363 459 of the applicant company.

Said process makes it possible to limit the costs of the items of equipment used for the preheating of oxidant by the use of a first exchanger for the heating of an oxygen-rich oxidizer, followed by second exchanger for the preheating of the oxidant, said oxidant being obtained by mixing the oxidizer heated in the first exchanger with a predominantly inert gas upstream of the second exchanger.

The installation comprises a melting chamber, for example a glass melting chamber, 100 equipped with burners 200 for the combustion of a fuel, such as natural gas, with an oxygen-rich oxidant. Although just one burner is shown in FIG. 1, such a melting chamber generally comprises several burners. This combustion generates heat and flue gases inside the chamber 100. The heat generated by this combustion is used for the melting of glass former in the chamber 100. The flue gases are discharged from the chamber by an outlet for flue gases 300. The discharged flue gases are hot (typically of the order of 1200° C. to 1600° C.) and contain a not insignificant amount of residual heat.

The present invention makes possible an optimized recovery and exploitation of the residual heat. At least a part of the discharged hot flue gases are introduced into an auxiliary exchanger 10 in which air used as auxiliary gas 21 (known hereinafter as "auxiliary air") circulates.

When only a part of the hot flue gases is introduced into the auxiliary exchanger 10, this part advantageously corresponds to at least 70 vol %, preferably at least 75 vol % and more preferably at least 80 vol % of the discharged flue gases.

In the auxiliary exchanger 10, the auxiliary air is heated by heat exchange with the hot flue gases. Hot auxiliary air 22, typically at a temperature of 600° C. to 900° C., and tempered flue gases 12 are thus obtained. The hot auxiliary air is introduced into a main exchanger 40b in which the oxygen-rich oxidant 42, typically a gas consisting for at least 90 vol % of oxygen, preferably for at least 95 vol %, circulates.

Inside the main exchanger 40a, 40b, the oxidant is preheated by heat exchange with a hot heat-exchange gas 23 which comprises at least a part of the hot auxiliary air 22.

Hot oxidant 43 and tempered heat-exchange gas 45 are thus obtained.

The hot oxidant is supplied to at least one of the burners 200 of the combustion chamber 100 and preferably to all of the burners 200 of the chamber 100.

In the FIGURE, just one exchanger 40b is shown. However, the installation can comprise several main exchangers 40a and 40b and in particular several examples of the exchanger 40b which is connected to the burner(s) 200. In this case, each main exchanger 40b preferably feeds a limited number of burners 200 with hot oxidant. For example, a main exchanger 40b can be combined with each of the burners 200 of the chamber 100 using oxygen-rich oxidant.

According to the present invention, it is possible to increase the heat supplied to the main exchanger 40a and 40b by replacing hot auxiliary air as heat-exchange fluid 23 with a mixture of hot auxiliary air with discharged hot flue gases. To this end, a part 13 of the discharged hot flue gases is not introduced into the auxiliary exchanger 10 for the heating of the auxiliary gas.

This part 13 of the hot flue gases is, on the contrary, mixed with the hot auxiliary air 22 (or only with the part of the hot auxiliary air which is introduced into the main exchanger 40a and 40b for the preheating of the oxidant 42).

In this way, it is possible to preheat the oxidant to a greater temperature and/or to preheat a greater flow rate of the oxidant. It is possible to preheat the oxidant in a single stage by introducing cold oxidant, for example at ambient temperature, into the exchanger 40b and by heating said oxidant up to its final temperature in the main exchanger 40b before supplying it to the burner(s) 200.

However, in the example illustrated in FIG. 1, the preheating of the oxidant is carried out in two stages. An oxygen-rich gas 41 is first introduced into an exchanger 40a additional to the main exchanger in which said rich gas 41 is heated by heat exchange with a part 24 of the hot auxiliary air up to a first temperature.

A partially heated rich gas and a tempered auxiliary air stream 44 are thus obtained. The partially heated rich gas 42 is then introduced as oxidant 42 into the main exchanger 40b.

It is also possible to further increase the thermal energy of the rich oxidant 42 before it is introduced into the main exchanger 40b by mixing a limited amount of the hot auxiliary air with the partially heated rich gas, said mixture then being introduced as rich oxidant 42 into the main exchanger 40b.

The disadvantage of this option is a slight reduction in the oxygen content of the -rich oxidant 42, 43. This method and its advantages are described in more detail in the above-mentioned co-existing patent application.

A part 25 of the hot auxiliary air is also used for the preheating of the fuel 3, for example natural gas, in a heat exchanger 30 referred to as fuel exchanger.

Preheated fuel 32, which is subsequently supplied to the burner(s) 200 of the combustion chamber 100, and a third stream of tempered auxiliary air 33 are thus obtained.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step. The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for the combustion, in a combustion chamber, of a fuel with a preheated oxygen-rich oxidant with generation of heat and hot flue gases inside said combustion chamber, wherein the process comprises the steps of:
    discharging the hot flue gases from the combustion chamber, wherein the resulting discharged flue gases contain residual heat;
    recovering residual heat by heating an auxiliary gas by heat exchange with at least a part of the discharged hot flue gases in an auxiliary heat exchanger, with a hot auxiliary gas and tempered flue gases being obtained,
    introducing at least a first part of the hot auxiliary gas into a main exchanger in which oxygen-rich oxidant is preheated by heat exchange with a first heat-exchange gas comprising said at least a first part of the hot auxiliary gas, with a preheated oxidant and a tempered heat-exchange gas being obtained; and
    supplying the preheated oxygen-rich oxidant to the combustion chamber for the combustion of the fuel,
    wherein a portion of the discharged hot flue gases is not introduced into the auxiliary exchanger and is instead mixed with said at least a first part of the hot auxiliary gas before it is introduced into the main exchanger in order to increase the thermal energy content of the first heat-exchange gas.

2. The process as claimed in claim 1, wherein the first heat-exchange gas consists of a mixture of hot auxiliary gas and the portion of the discharged hot flue gases.

3. The process as claimed in claim 1, wherein the auxiliary gas is a predominantly inert gas, preferably chosen from steam, $CO_2$ and the mixtures of these two gases.

4. The process as claimed in claim 1, wherein the auxiliary gas is chosen from air or a mixture of air with a predominantly inert gas.

5. The process as claimed in claim 1, wherein the content of discharged hot flue gases of the first heat-exchange gas is less than or equal to 30 vol %.

6. The process as claimed in claim 1, wherein the ratio by volume of, on the one hand, discharged hot flue gases to, on the other hand, the first hot auxiliary gas in the first heat-exchange gas is less than or equal to 45 vol %.

7. The process as claimed in claim 1, wherein the combustion chamber is a melting chamber, a refining chamber, a melting/refining chamber or a combustion chamber of a boiler.

8. The process as claimed in claim 7, wherein the combustion chamber is a glass melting chamber, a glass refining chamber or a glass melting/refining chamber.

9. A process for the combustion, in a combustion chamber, of a fuel with a preheated oxygen-rich oxidant with generation of heat and hot flue gases inside said combustion chamber, the process comprising the steps of:
    discharging the hot flue gases from the combustion chamber, said discharged flue gases containing residual heat;
    recovering residual heat by heating an auxiliary gas by heat exchange with at least a part of the discharged hot flue gases in an auxiliary heat exchanger, with a hot auxiliary gas and tempered flue gases being obtained;
    introducing at least a first part of the hot auxiliary gas into a main exchanger in which oxygen-rich oxidant is preheated by heat exchange with a first heat-exchange gas comprising said at least a first part of the hot auxiliary gas, with a preheated oxidant and a tempered heat-exchange gas being obtained; and supplying the preheated oxygen-rich oxidant to the combustion chamber for the combustion of the fuel, wherein the process further includes:

a first mode of operation in which the first heat-exchange gas does not comprise discharged hot flue gases, and a second mode of operation in which a portion of the discharged hot flue gases is not introduced into the auxiliary exchanger and is instead mixed with said at least a first part of the hot auxiliary gas before it is introduced into the main exchanger in order to increase the thermal energy content of the first heat-exchange gas.

10. The process as claimed in claim 9, wherein, in the first mode of operation, the heat-exchange gas consists of hot auxiliary gas.

11. An installation comprising a combustion chamber, a first heat exchanger, referred to as auxiliary exchanger, and a second heat exchanger, referred to as main exchanger, the combustion chamber being provided with injectors for the injection of a fuel and for the injection of an oxidant into the combustion chamber and with an outlet for flue gases;

the auxiliary exchanger comprising, on the one hand, an inlet for hot flue gases and an outlet for tempered flue gases and, on the other hand, an inlet for auxiliary gas to be heated and an outlet for hot auxiliary gas, the outlet for hot flue gases of the combustion chamber being fluidly connected to the inlet for hot flue gases of the auxiliary exchanger; and the main exchanger comprising, on the one hand, an inlet for hot heat-exchange gas and an outlet for tempered heat-exchange gas and, on the other hand, an inlet for oxidant to be preheated and an outlet for preheated oxidant, the outlet for hot auxiliary gas of the auxiliary exchanger being fluidly connected to the inlet for hot heat-exchange gas of the main exchanger, the outlet for preheated oxidant being fluidly connected to at least one of the injectors of the combustion chamber, wherein the installation also comprises a pipeline configured to fluidly connect the outlet for hot flue gases to the inlet for the hot heat-exchange gas of the main exchanger in parallel with the auxiliary exchanger, so as to enable the flow of a controlled part of the hot flue gases resulting from the outlet for flue gases toward the inlet for the hot heat-exchange gas of the main exchanger.

12. The installation as claimed in claim 11, wherein the injectors for the injection of fuel and oxidant are incorporated in burners and/or injection lances.

13. The installation as claimed in claim 11, wherein the combustion chamber is a melting chamber, a refining chamber, a melting/refining chamber or the combustion chamber of a boiler, preferably a glass melting chamber, a glass refining chamber or a glass melting/refining chamber.

* * * * *